United States Patent [19]

Suzuki

[11] Patent Number: 5,455,654
[45] Date of Patent: Oct. 3, 1995

[54] MULTI-AREA FOCUS DETECTION APPARATUS FOR DETECTING FOCUS EITHER AUTOMATICALLY OR INTENTIONALLY

[75] Inventor: Kenji Suzuki, Kawasaki, Japan

[73] Assignee: Canon Kabushiki Kaisha, Tokyo, Japan

[21] Appl. No.: 316,321

[22] Filed: Sep. 30, 1994

Related U.S. Application Data

[63] Continuation of Ser. No. 235,145, Apr. 28, 1994, abandoned, which is a continuation of Ser. No. 876,444, Apr. 30, 1992, abandoned.

[30] Foreign Application Priority Data

May 2, 1991 [JP] Japan .................................. 3-130615

[51] Int. Cl.⁶ .................................................. G03B 13/36
[52] U.S. Cl. ........................................... 354/402; 354/410
[58] Field of Search ................................ 354/402, 403, 354/410, 412, 406, 407, 62, 409

[56] References Cited

U.S. PATENT DOCUMENTS

| 4,954,701 | 9/1990 | Suzuki et al. ............... 354/406 X |
| 5,006,700 | 4/1991 | Kosaka et al. ............... 354/403 X |
| 5,019,854 | 5/1991 | Mukai ............................. 354/402 X |
| 5,036,347 | 7/1991 | Tsunekawa et al. ............ 354/400 |
| 5,051,766 | 9/1991 | Nonaka et al. ................ 354/402 X |
| 5,183,443 | 2/1993 | Murakami et al. ............. 475/168 |
| 5,214,466 | 5/1993 | Nagano et al. ................ 354/402 |
| 5,225,862 | 7/1993 | Nagano et al. ................ 354/62 |
| 5,245,371 | 9/1993 | Nagano et al. ................ 354/62 |
| 5,253,008 | 10/1993 | Konishi et al. ............... 354/402 |
| 5,280,312 | 6/1994 | Yamada et al. ................ 351/211 |
| 5,298,927 | 3/1994 | Konishi et al. ............... 351/211 |

FOREIGN PATENT DOCUMENTS

| 1241511 | 9/1989 | Japan . |
| 1288810 | 11/1989 | Japan . |
| 1288813 | 11/1989 | Japan . |
| 1274736 | 11/1989 | Japan . |
| 4138436 | 5/1992 | Japan . |

Primary Examiner—Russell E. Adams
Attorney, Agent, or Firm—Fitzpatrick, Cella, Harper & Scinto

[57] ABSTRACT

Multi-area focus detection apparatus for detecting focus either automatically or intentionally includes focus detection structure for detecting focus information to a plurality of points within a photographing area formed by the objective lens. Automatic selection circuitry is provided for automatically selecting a distance measuring point from among the plural distance measuring points. Intentional selection circuitry is provided for selecting an arbitrary distance measuring point from among the plural distance measuring points in accordance with a photographer's intention. The number of distance measuring points which are subject to selection by the automatic selection circuitry is different from the number of distance measuring points which are subject to selection by the intentional selection circuitry. Preferably, the number of distance measuring points for intentional selection is less than (but a subset of) the number of distance measuring points for automatic selection. Preferably, the intentional selection is performed by detecting the visual axis of the photographer.

36 Claims, 4 Drawing Sheets

MULTI-AREA FOCUS DETECTION APPARATUS FOR DETECTING FOCUS EITHER AUTOMATICALLY OR INTENTIONALLY

This application is a continuation of application Ser. No. 08/235,145, filed Apr. 28, 1994, now abandoned, which is a continuation of application Ser. No. 07/876,444, filed Apr. 30, 1992, now abandoned.

BACKGROUND OF THE INVENTION

1. Field of the Invention

The present invention relates to an automatic focusing system wherein plural points in a field of view framed by a lens are available for detecting the focus state of the lens, and any one of those points can be selected as a targeted point to be in-focus. This invention can be adequately embodied in still cameras, video cameras, or any other types of cameras.

2. Related Background Art

Various automatic focusing systems have been proposed wherein plural points in a field of view are available for detecting the focus state of a lens or measuring a distance to a subject from a camera, and some of those points are selected as a targeted point to be in-focus. For example, in an active automatic focusing system with the rangefinder, three to five different beams from infrared-emitting diodes are available. Each beam independently provides measurement of the camera-to-subject distance and the measured results are compared and analyzed to determine which beam points to the object a photographer wants to take a picture of. This beam is taken and the information on the distance measured by that beam is used to adjust the lens for focusing.

In this type of system, automatic focusing is achieved no matter where the image of the object is in the field of view. Thus, this system gives a photographer the advantage that he can concentrate on his artistic work such as composing the picture.

The single-point-focus-detection automatic focusing systems have the disadvantage that a photographer has to place the focus-detection point over the subject in the viewfinder. Otherwise automatic focusing does not work.

On the other hand, multi-point-focus-detection automatic focusing systems have the advantage that a photographer can freely make any composition of a picture with no special techniques such as autofocus locking.

The multi-focus-detection-point automatic focusing system has been adopted to single-lens reflex cameras. In the passive system, natural light from the subject is used for automatic focusing and distances from the camera to plural different points on the subject are measured. Evaluation of the measured distances to the plural points is carried out to determine or speculate the which point a photographer aims. Thus, one point is taken and the information on the distance to that point is used to adjust the lens and control the focusing state.

The present inventor presented such an automatic focusing system described above in Japanese Patent Application Laid-Open Nos. 1-288810 and 1-288813. In Japanese Patent Application Laid-Open No. 1-288810, was disclosed the automatic focusing system comprising an optical system which provides plural focus-detection points and plural sensors arranged adequately. In Japanese Patent Application Laid-Open No. 1-288813, was disclosed the method to select a point properly from the plural focus-detection points.

Single lens reflex cameras are often expected to provide the capability to achieve any composition of a picture in conjunction with the good technique of a photographer. In order to realize such a requirement, it must be possible that the photographer himself selects any focus-detection point as a targeted point to be in-focus according to his intention, instead of the automatic focusing system.

The intentional selection of the focus-detection point by a photographer is very important especially when a camera is mounted on a tripod, because autofocus locking does not work in this case. Also, in the case where there are some obstacles between the main subject and a camera, intentional selection by the photographer is needed because it is difficult for the camera to distinguish what is the real subject to which the photographer aims. The present inventor proposed, in Japanese Patent Application No. 2-260839, the camera system which has means for intentional selection and a display to indicate to which point is selected for confirmation.

As described just above, there are two ways to select a proper point (or an otherwise small number of points) from the plural focus-detection points for adjusting the lens. One is the automatic selection and the other is intentional selection by a photographer. Some cameras provide both the means of intentional selection and automatic selection, but they have the following problems:

When selection is done automatically, it is desirable that there are as many focus-detection points arranged as densely as possible. These points must be arranged densely enough so that some point can automatically hit the subject no matter where the subject is in the field of view. The automatic selection must be possible with no care by a photographer, in fact, many cameras have no display to indicate a targeted point. As explained just above, too small density of focus-detection points leads to the high risk that no point hits the subject. High density points, or almost continuously arranged points are desirable so that some point can hit the right subject to which a photographer aims, under whatever conditions, independently of the subjects, the distance between the subject and the camera, the exchanging of lenses, or the zoom ratio.

On the other hand, when the focus-detection point is selected intentionally by a photographer, it is desirable that the points are distributed at the proper space, because too short of a spacing between the neighboring points causes troublesome selecting operation with no significant practical advantage. Moreover, when the point is selected by a photographer, there must be some means to show the photographer where the targeted point is. It is desirable that displays for that purpose are in the viewfinder. If there are too many or too dense displays, it is difficult for a photographer to distinguish the displays. It is also difficult to give high enough brightness to many displays. From these points of view, the adequate number of the focus-detection points in the horizontal direction is three to five, or the adequate space between each point is 5 to 6 for the 35-mm films. For the vertical direction, three points are enough.

As discussed above, the adequate arrangement or adequate number of the points depends on whether the point is selected intentionally by a photographer or by a camera itself automatically. Therefore, there has been a difficult problem of how to realize two different arrangements of focus-detection points in a camera at the same time.

SUMMARY OF THE INVENTION

An object of present invention is to achieve an automatic focusing system which provides an adequate arrangement of focus-detection points to get good focusing for both operation modes, automatic selection and intentional selection modes.

The automatic focusing system according to the present invention comprises a means to detect the focus state at plural different focus-detection points on the image of a subject which is formed by the optical system in the field of view of the viewfinder, a means to select, automatically, any adequate point from the plural focus-detection points, and a means for a photographer to select intentionally any adequate point from the plural focus-detection points. The automatic focusing system according to the present invention has two different sets of focus-detection points, one is for automatic selection and the other is for intentional selection. Another feature of the present invention is that the set of focus-detection points for intentional selection comprises part of set of the points for automatic selection. Another feature of the present invention is that there is a means to indicate the position of the focus-detection point which is selected as a targeted point to be in-focus.

DESCRIPTION OF THE PREFERRED EMBODIMENTS

Figure 1:
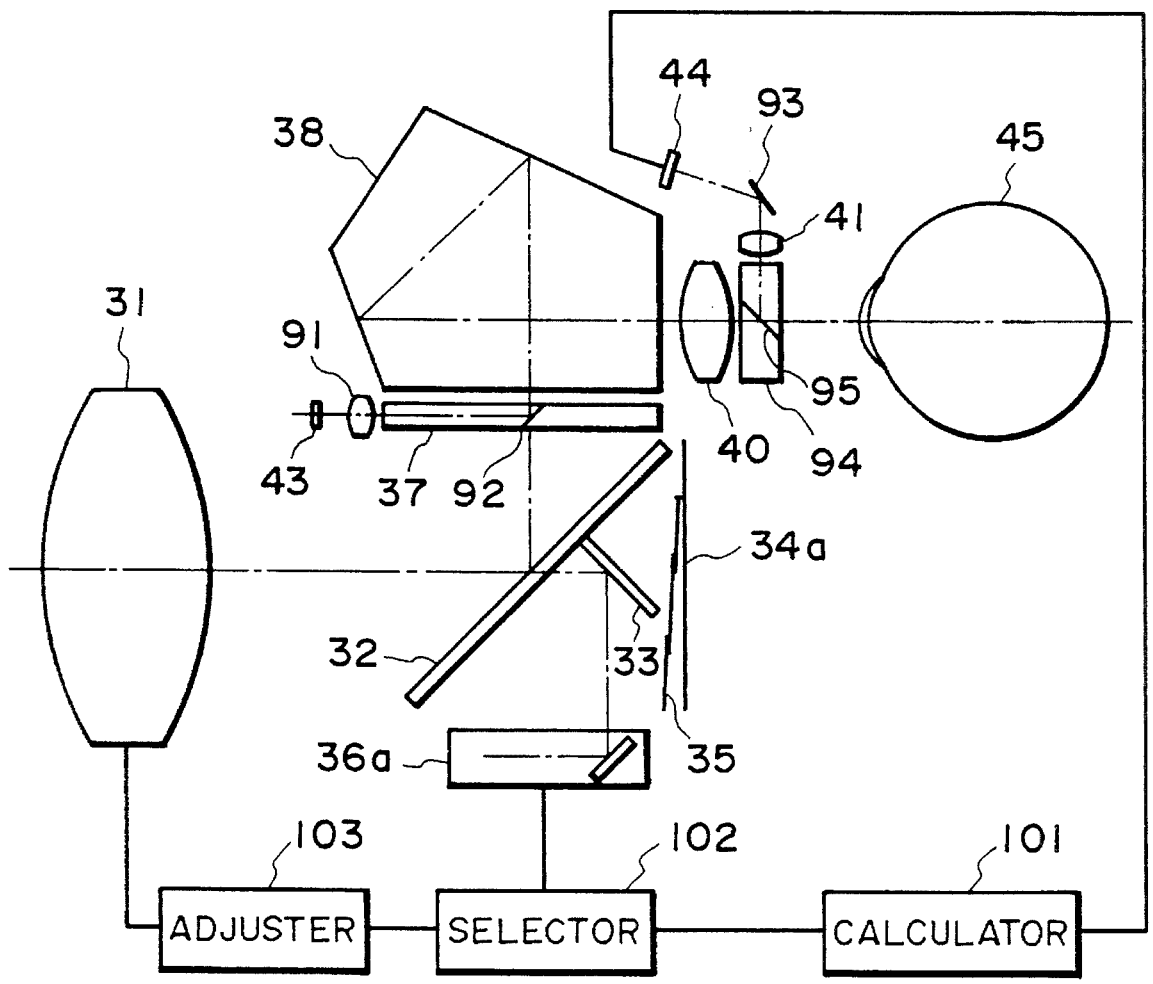
FIG. 1 is a general diagrammatic representation of elements of the embodiment adopted for a single-lens reflex camera.

FIG. 1 is a general diagrammatic representation of elements of the embodiment adopted for a single-lens reflex camera.

Figure 2:
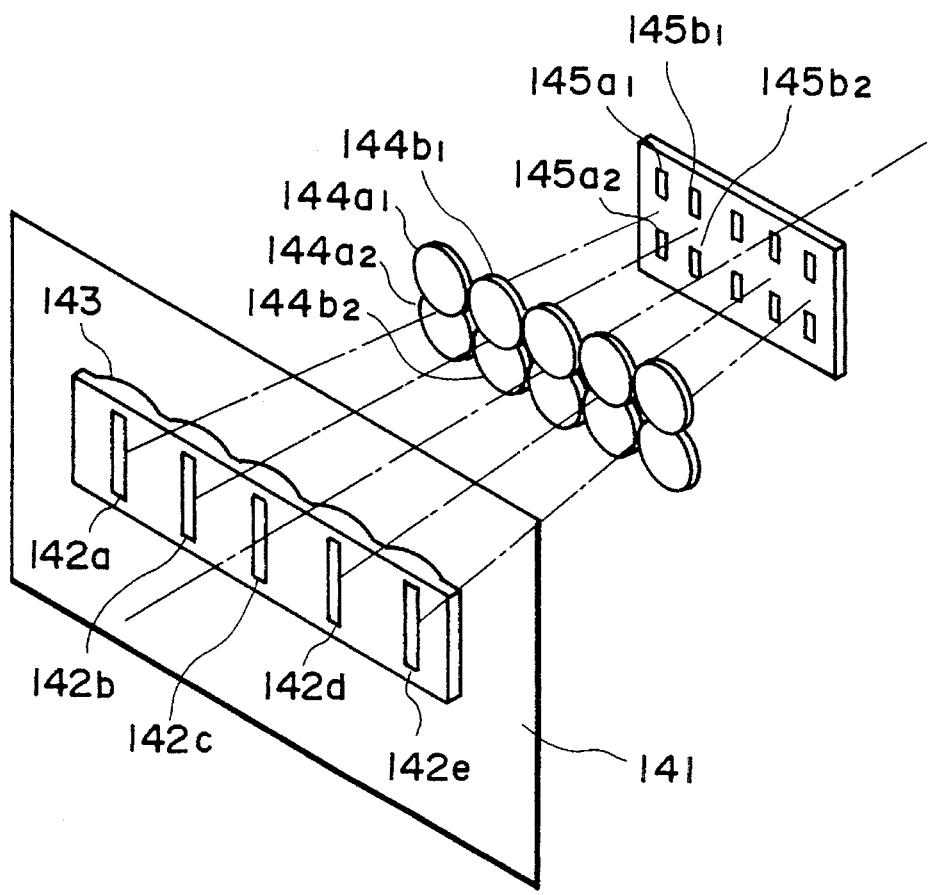
FIG. 2 is perspective representation of part of FIG. 1.

FIG. 2 is a perspective representation of part of FIG. 1.

In the figures, 40 is an eye-piece and 94 is an optical block having a dichroic mirror 95 which is transparent to visible light and semi-transparent to infrared light. The mirror 95 works also as a light-path divider. 41 is a lens, 93 is a mirror, and 44 is an array of photodetectors. A lens 41 and an array of photodetectors are part of the means to receive light. The photodetector array 44 comprises plural photodetectors aligned in a single line, or in plural lines if necessary, in the direction perpendicular to the plane of FIG. 1. 43 is a light source such as infrared LED. 91 is a light-projection lens and 37 is a focusing screen including a light-dividing plane 92. A plane 92 comprises a half mirror or a dichroic mirror.

In FIG. 1, infrared light emitted from the light source 43 is condensed with lens 91 and introduced into the focusing screen 37. Then, light is reflected by the light-dividing plane 92 and enters the eye-piece 40 through the pentaprism 38. Passing through the eye-piece 40 and then the dichroic mirror 95, the light arrives at the eye 45 of an observer (photographer) which exists near the eye-point E. The infrared light is reflected by the eye, then it is reflected by the dichroic mirror 95. The lens 41 lets the light converge and form the image on the photodetector array 44 based on the reflection from the eye.

A calculator 101 calculates the direction of the line of sight of the photographer's eye by using the signals from the photodetector array 44 and determines what point in the field of viewfinder the photographer looks at. Then, the focus-detection point corresponding to the point the photographer looks at is taken as a target for focusing in the intentional selection mode.

A more detailed representation of the detection of the line of sight is given in Japanese Patent Application Laid-Open No. 1-241511 or No. 1-274736.

In this embodiment, said elements 40, 41, 43, 44, 91, 94, and 101 form one of the elements of a means for a photographer to select the focusing target in the intentional selection mode. 31 is a main lens, 32 is a quick-return mirror, and 33 is a submirror fixed to the quick-return mirror 32. 34 is a film (image plane) and 35 is a shutter. 36a is a means to detect focus states at plural points (regions) in the field of viewfinder and select one of those points as a targeted point to be in-focus and output the signal representing the focus state of the selected point. Thus, 36a has a function of automatic selection of a target point. An example of the methods to select the target point from the plural points is to take the point which corresponds to the nearest subject to the camera. Another example is represented in Japanese Patent Application Laid-Open No. 1-288813.

102 is a means to select a signal from the plural signals on focusing states sent from the mean of focus detector 36a. Signal selection is done by evaluating the signals on the direction of the line of sight which are sent from the calculator 101. The calculator 101 is one of the elements forming a means to detect the line of sight. After selection, 102 outputs the selected signal. The purpose can also be achieved by judging the signal on the line of sight and by detecting only the point which corresponds to the point the photographer looks at in the viewfinder. The means of selection 102 also works as a switch to select the automatic selection mode or the intentional selection mode. 103 is a means to adjust the focusing state by driving the system 1 (not shown in the figure) judging the signals on focusing state which are sent from the means of selection 102 in either mode.

The method to detect focusing states in the focus detector 36a is known. And this method is not a prominent feature of the present invention, therefore just a brief outline is presented next.

In FIG. 2, there are five focus-detection fields 142a, 142b, ... 142e on the mask-lens element 141 which is put near the expected focus plane. Each field has a means of focus detection which is known. (The number of fields is not necessarily five, in fact more than five are used in the example of an embodiment presented later.) The image light ray passes through one of the rectangular view-mask apertures in the mask-lens element 141 for example 142a near the left edge, and is deflected with one of the integrally formed complex field lenses 143, and enters a pair of secondary image lens $144a_1$ and $144a_2$.

There are diaphragms (not shown in the figure) in front of the secondary image lenses $144a_1$ and $144a_2$. After passing through the secondary image lens $144a_1$, light the ray forms the image of view field $142a$ on the array of photodetector $145a_1$. The light ray, which passes through the secondary image lens $144a_2$, also forms the image of view field $142a$ on the array of photodetector $145a_2$. The field lens makes the image of the diaphragms in front of the secondary image lenses approximately on the exit pupil of the main (objective) lens, Thus, the optical system described here forms a pupil-dividing focus detector. Five focus detectors of this type are formed integrally.

In these focus detectors, the known concept of focus detection is adopted. Known technology is also used to calculate the extent of defocus of the main lens 31 by using the signal from the photodetector array.

Figure 3:
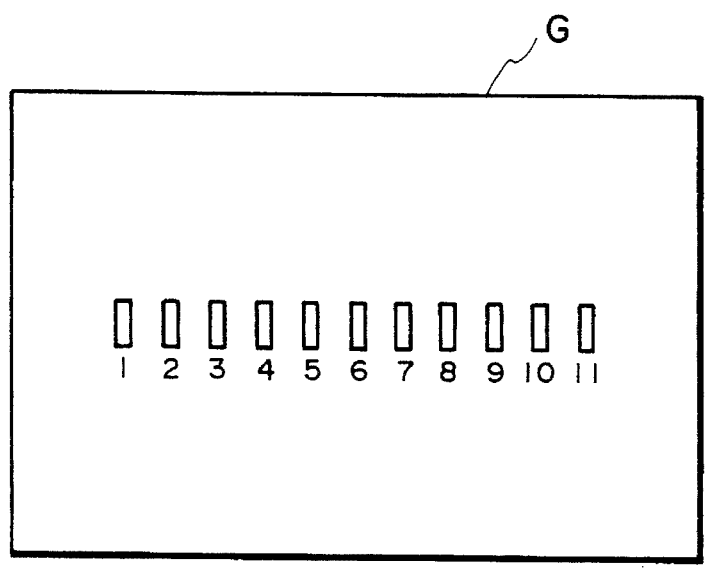
FIG. 3 is a diagrammatic representation of plural focus-detection points in the field of view.

The features of methods of automatic selection and intentional selection by this invention are as follows, FIG. 3 is a diagrammatic representation of plural focus-detection points in the field of view framed by the main lens. In this embodiment, there are eleven focus-detection points 1–11 in a longitudinal line. These points are displayed on a display 100 (see also FIG. 1), and are arranged in the same way as those shown in FIG. 2. In this example, while the focus-detection fields 1–11 have the shape of rectangle whose longer sides are across the picture plane G, the focus-detection fields may have another shape and may be arranged in different way.

Figure 4:
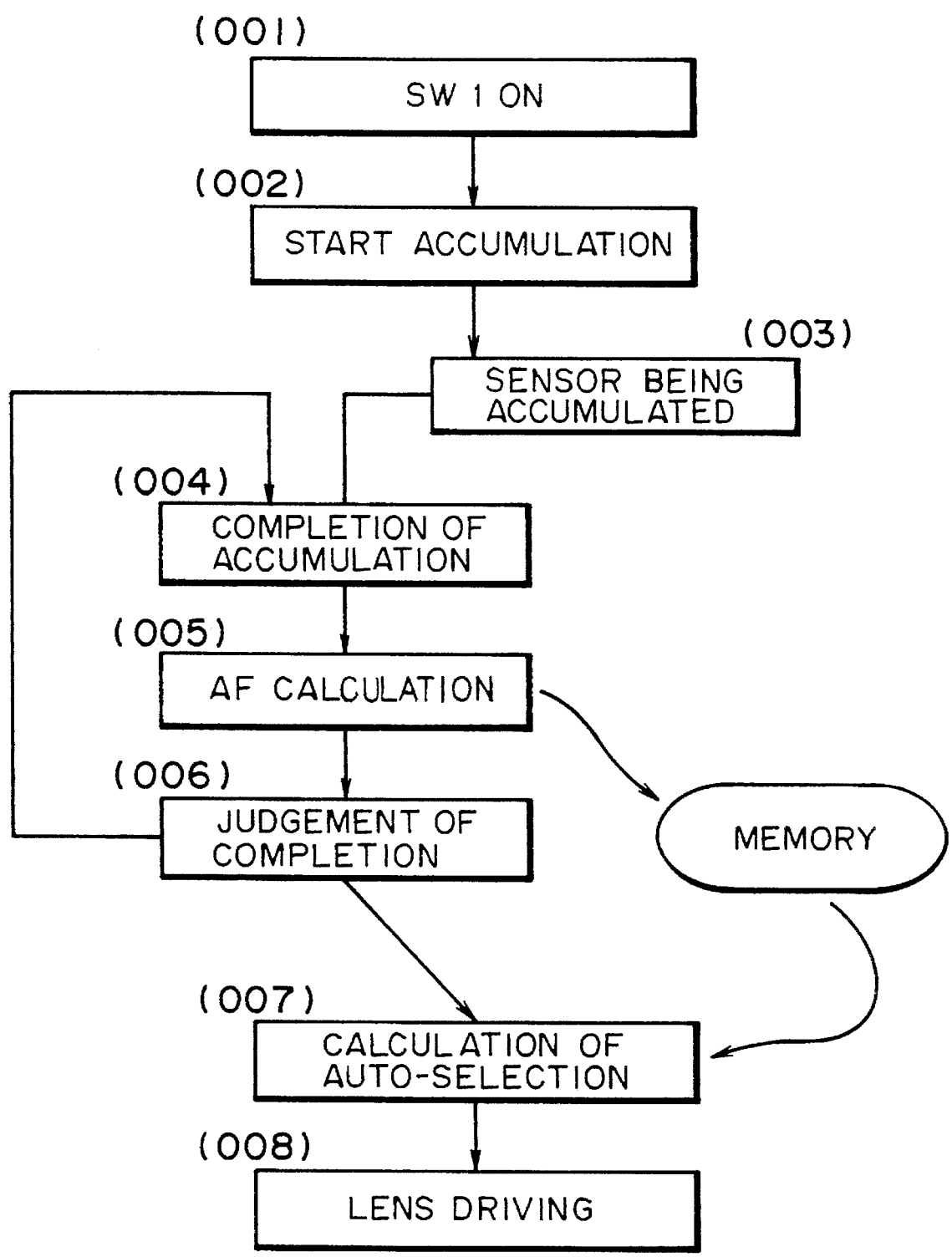
FIG. 4 is a flow chart of the procedures in which some focus-detection point is selected from plural points.

FIG. 4 shows a flow chart of the algorithm to select a point from the plural focus-detection points in the automatic mode. In the step 001 of the flow chart, turning on of the switch 1 causes the automatic focusing (AF) sequence to start. In the step 2, accumulation starts in each accumulation-type array sensor corresponding to each of eleven focus-detection points. In the step 3, the amount of the accumulated charge is monitored by a means of monitoring, and the accumulation continues until the accumulated charge achieves a given criterion. In the step 4, the signal appears to show the completion of accumulation when any of sensor achieved the criterion. The signal indicating the position of the sensor which achieved the criterion is also outputted.

In the step 5, the signals from the sensor which has completed the accumulation are read to carry out automatic focusing calculation (AF calculation). The calculated results are stored in the memory. During this procedure, the other sensors might still be accumulating charge or otherwise waiting for AF calculation after having completed accumulation. In the step 6, a judgement is made whether all sensors completed the AF calculation. If some sensors are not complete, the process goes back to step 4. If completed, the step 7 starts in which the information stored in the memory are read and evaluated to determine or speculate which sensor corresponds to the targeted subject. In the step 8, the lens is driven to get the best focus.

In the intentional selection mode, a different set of focus-detection points are used. In this embodiment, instead of the using all the points, part of focus-detection points, for example, just five focus-detection points 1, 3, 6, 9, and 11 in FIG. 3 are used. Reducing the number of focus-detection points leads to an easier operation in the intentional selection mode. After the reduction in the number of focus-detection points, there still exist enough points for practical purposes.

In addition to the methods of focus detection described earlier, there are other methods or means available for inputting the photographer's intention such as electronic dials, a joy stick, or track balls.

Figure 5:
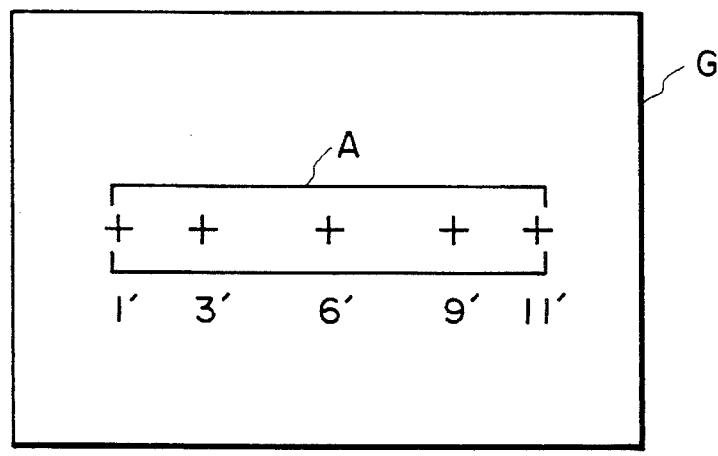
FIG. 5 is a diagrammatic representation of the plural focus-detection points in the field of view.

FIG. 5 is a diagrammatic representation of an example of adequate indications in the display 100 displayed field of view of the viewfinder. A large frame A on the picture plane G defines the focus-detection area in the automatic selection mode and the cross-shape marks 1', 3', 6', 9', and 11' define the focus-detection points in the intentional selection mode. More points than those might lead to the difficulty in seeing the indication. In the intentional selection mode, there must be some displays which indicate which focus-detection point was selected by a photographer. The display for that purpose may be located either in the view field of the viewfinder or out of it, but being located in the view field of the viewfinder has the advantage that a photographer can see the display and the subject at the same time. As an example of the method to display the selected point, marks like those in FIG. 5 are formed on the focusing screen and just the selected mark is illuminated by the means of illumination. Or, otherwise, there may be no mark on the focusing screen and the image of the mark may be formed by projection just to the selected position on the focusing screen.

The simplest way for controlling a lens in the intentional selection mode, is to make a focus detection only at the selected point and adjust the lens accordingly. If a subject is small and a photographer can not fix the camera firmly enough due to the vibration of his hands, the selected focus-detection point can not always catch the subject and often loss it. In this case, a stable focusing operation is not possible. In order to solve this problem, it is useful to make additional focus detections at two neighboring points. And a stable operation can be obtain by selecting either of these two results or otherwise by synthesizing these two results. For example, when 3 is selected, points 2 and 4 can be added for that purpose. This compensation operation can not be recognized by a photographer and it seems that just one point works for him, therefore the operation is simple and easy.

Figure 6:
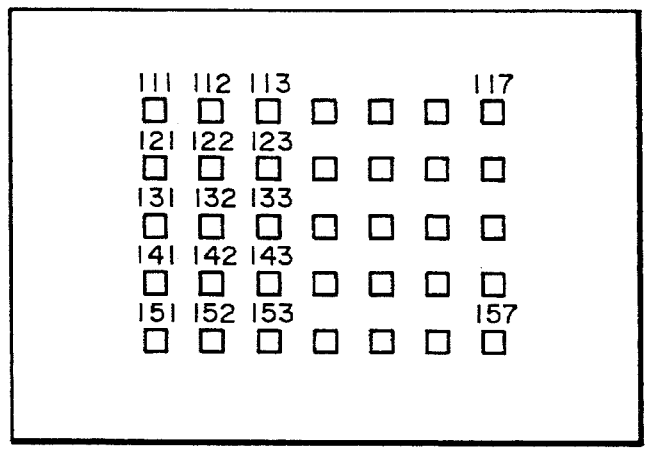
FIG. 6 is a diagrammatic representation of the plural focus-detection points in the field of view.
Figure 7:
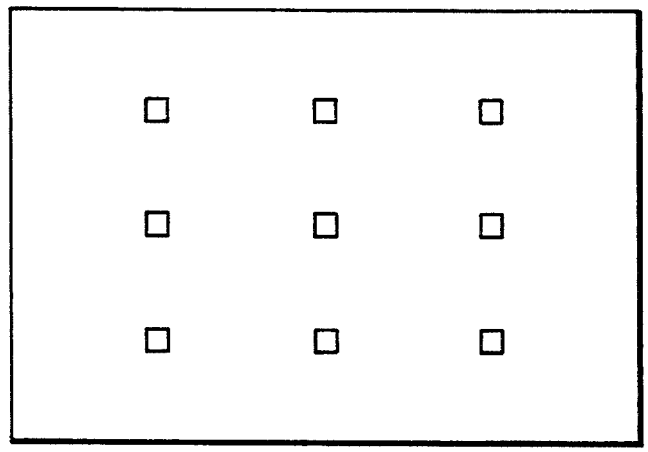
FIG. 7 is a diagrammatic representation of the plural focus-detection points in the field of view.

FIG. 6 and FIG. 7 show other examples of the array of the plural focus-detection points on display 100 displayed in the view field of the viewfinder. In the example of FIG. 6, there are sensors for focus detection arranged almost continuously in a two-dimensional way. The example of FIG. 6 has 35 focus-detection points 111–157 (7 by 5), but the number of sensors may be much more such as 1,000–10,000 which can be achieved with a separator-twin-lens automatic focus detector in conjunction with two-dimensional array sensors. When the number of sensors is large enough, like the example shown in FIG. 7, it is not necessary to display the frame in the viewfinder to define the sensor area.

A part of these sensors can be taken for the intentional selection mode like the example shown in FIG. 1. It is desirable to have some displays indicating the point selected by a photographer in the intentional selection mode.

Thus, the present invention provides an automatic focusing system which exhibits good performance and easy operation in both of automatic selection mode and intentional selection mode to provide different sets of sensors for each mode.

What is claimed is:

1. An focus detection apparatus, comprising:
   focus detection means for detecting distance measuring information for plural points within a photographing area formed by a phototaking lens;
   automatic selection means for automatically selecting a distance measuring point from among the plural distance measuring points; and intentional selection means for selecting an arbitrary distance measuring point from among the plural distance measuring points in accordance with a photographer's intentional input operation, wherein a number of distance measuring points which are subject to selection by said automatic selection means is different from a number of distance measuring points which are subject to selection by said intentional selection means.

2. An apparatus according to claim 1, wherein the number of distance measuring points from among which said automatic selection means can select is greater than the number of distance measuring points from among which said intentional selection means can select.

3. An apparatus according to claim 1, wherein the distance measuring points which are subject to selection by said intentional selection means comprises a subset of the distance measuring points which are subject to selection by said automatic selection means.

4. An apparatus according to claim 1, further comprising display means for displaying the distance measuring points subject to selection by said intentional selection means.

5. Camera apparatus comprising:

phototaking lens means;

focusing state detection means for detecting a focusing state of said phototaking lens means at a plurality of points in a photographing area;

point detection means for detecting focus information of a point selected by a photographer from among said plurality of points in the photographing area;

evaluation selection means for evaluating the focusing states of said plurality of points detected by said focus state detection means, and for selecting a point to which the focusing of said photographing lens means is to be adjusted; and focus adjusting means for adjusting the focusing of said phototaking lens with respect to the point selected by said point detection means or the point selected by said evaluation selection means, wherein the number of target points selectable by the photographer is different than the number of target points selectable by said evaluation selection means.

6. An apparatus according to claim 5, wherein a number of points which said evaluation selection means can select is greater than a number of points which the photographer can select.

7. An apparatus according to claim 5, wherein said point detection means detects a direction of a visual axis of the photographer.

8. An apparatus according to claim 5, further comprising display means for displaying the point detected by said point detection means.

9. An apparatus according to claim 5, further comprising mode changeover means which changes between the point selection of said point selection means and the point selection of said evaluation selection means.

10. An apparatus for adjusting a focusing state of phototaking lens, comprising:

focusing state detection means for detecting a focusing state of said phototaking lens at a plurality of points in a photographing area;

point detection means for detecting a focus state of a point selected by a photographer from among said plurality of points in the photographing area; and evaluation selection means for evaluating the focusing states of said plurality of points detected by said focusing state detection means, and for selecting a point to which the focusing of said photographing lens is to be adjusted, said phototaking lens being focus adjusted in accordance with the focusing state of the point selected by said point detection means or the point selected by said evaluation selection means, wherein the number of target points selectable by the photographer is different than the number of target points selectable by said evaluation selection means.

11. An apparatus according to claim 10, wherein a number of points which said evaluation selection means can select is greater than a number of points which the photographer can select.

12. An apparatus according to claim 10, wherein said point detection means detects a direction of a visual axis of the photographer.

13. An apparatus according to claim 10, further comprising an display means for displaying the point detected by said point detection means.

14. An apparatus according to claim 10, further comprising mode changeover means for changing between the point selection of said point selection means and the point selection of said evaluation selection means.

15. A focus detection apparatus, comprising:

focus detection means for detecting distance measuring information for plural points in a view field of an imaging optical system;

automatic selection means for automatically selecting a distance measuring point from among the plural distance measuring points; and intentional selection means for selecting an arbitrary distance measuring point from among the plural distance measuring points in accordance with a user's intentional input operation, wherein a number of distance measuring points which are subject to selection by said automatic selection means is different from a number of distance measuring points which are subject to selection by said intentional selection means.

16. An apparatus according to claim 15, wherein the distance measuring points which are subject to selection by said intentional selection means comprises a subset of the distance measuring points which are subject to selection by said automatic selection means.

17. An apparatus according to claim 15, further comprising display means for displaying the distance measuring points subject to selection by said intentional selection means.

18. An apparatus according to claim 15, wherein the number of distance measuring points for said automatic selection is greater than the number of distance measuring points for said intentional selection.

19. An apparatus according to claim 18, further comprising display means for displaying the distance measuring points selected by said automatic selection means and the distance measuring points selected by said intentional selection means.

20. An image forming apparatus, comprising:

focus detection means for detecting distance measuring information for plural points in a view field of an imaging optical system;

automatic selection means for automatically selecting a distance measuring point from among the plural distance measuring points; and intentional selection means for selecting an arbitrary distance measuring points from among the plural distance measuring points in accordance with a user's intentional input operation, wherein a number of distance measuring points which are subject to selection by said automatic selection means is different from a number of distance measuring points which are subject to selection by said intentional selection means.

21. An apparatus according to claim 20, wherein the distance measuring points which are subject to selection by said intentional selection means comprises a subset of the distance measuring points which are subject to selection by said automatic selection means.

22. An apparatus according to claim 20, further comprising display means for displaying the distance measuring points subject to selection by said intentional selection means.

23. An apparatus according to claim 20, wherein the number of distance measuring points for said automatic selection is greater than the number of distance measuring points for said intentional selection.

24. An apparatus according to claim 23, further comprising display means for displaying the distance measuring points selected by said automatic selection means and the distance measuring points selected by said intentional selection means.

25. An apparatus for adjusting a focusing state of an imaging optical system, said apparatus comprising:
   focus detection means for detecting distance measuring information for plural points in a view of an imaging optical system;
   automatic selection means for automatically selecting a distance measuring point from among the plural distance measuring points;
   intentional selection means for selecting an arbitrary distance measuring point from among the plural distance measuring points in accordance with a user's intentional input operation, wherein a number of distance measuring points which are subject to selection by said automatic selection means is different from a number of distance measuring points which are subject to selection by said intentional selection means; and
   means for adjusting a focusing state of said imaging optical system in accordance with the distance measuring information of the point selected by said automatic selection means or the point selected by said intentional selecting means.

26. An apparatus according to claim 25, wherein the distance measuring points which are subject to selection by said intentional selection means comprises a subset of the distance measuring points which are subject to selection by said automatic selection means.

27. An apparatus according to claim 25, further comprising display means for displaying the distance measuring points subject to selection by said intentional selection means.

28. An apparatus according to claim 25, wherein the number of distance measuring points for said automatic selection is greater than the number of distance measuring points for said intentional selection.

29. An apparatus according to claim 28, further comprising display means for displaying the distance measuring points selected by said automatic selection means and the distance measuring points selected by said intentional selection means.

30. An autofocus system comprising:
   means for detecting focus information with respect to plural detecting portions;
   means for automatically selecting a portion from among the plural detecting portions; and
   means for intentionally selecting a desired portion from the plural detecting portions,
   wherein a number of portions which are subject to selection by said automatic selection means is different from a number of portions which are subject to selection by said intentional selection means.

31. An image forming apparatus comprising:
   means for forming an image of an object;
   means for detecting focus information with respect to plural detecting portions;
   means for automatically selecting a portion from among said plural detecting portions; and
   means for intentionally selecting a desired portion from said plural detecting portions,
   wherein a number of portions which are subject to selection by said automatic selection means is different from a number of portions which are subject to selection by said intentional selection means.

32. An autofocus system comprising:
   means for detecting focus information with respect to plural detecting portions;
   means for automatically selecting a portion from among the plural detecting portions; and
   means for intentionally selecting a desired portion from the plural detecting portions,
   wherein a number of portions which are subject to selection by said automatic selection means is larger than a number of portions which are subject to selection by said intentional selection means.

33. An image forming apparatus comprising:
   means for forming an image of an object;
   means for detecting focus information with respect to plural detecting portions;
   means for automatically selecting a detecting portion from among the plural detecting portions; and
   means for intentionally selecting a desired portion from the plural detecting portions,
   wherein a number of portions which are subject to selection by said automatic selection means is larger than a number of portions which are subject to selection by said intentional selection means.

34. An autofocus system comprising:
   means for detecting focus information with respect to plural detecting portions;
   means for automatically selecting a portion from among the plural detecting portions; and
   means for intentionally selecting a desired portion from the plural detecting portions,
   wherein a part of portions which are subject to selection by said automatic selection means is not subject to selection by said intentional selection means.

35. An image forming apparatus comprising:
   means for forming an image of an object;
   means for detecting focus information with respect to plural detection portions;
   means for automatically selecting a desired portion from the plural detecting portions; and
   means for intentionally selecting a desired portion from the plural detecting portions, wherein a part of portions which are subject to selection by said automatic selection means is not subject to selection by said intentional selection means.

36. An optical apparatus comprising:

means for detecting focus information with respect to plural detecting portions;

means for automatically selecting a portion from among the plural detecting portions; and means for intentionally selecting a desired portion from the plural detecting portions, wherein a part of portions which are subject to selection by said automatic selection means is not subject to selection by said intentional selection means.

* * * * *

UNITED STATES PATENT AND TRADEMARK OFFICE
CERTIFICATE OF CORRECTION

PATENT NO. : 5,455,654
DATED : October 3, 1995
INVENTOR(S) : KENJI SUZUKI

It is certified that error appears in the above-indentified patent and that said Letters Patent is hereby corrected as shown below:

COVER PAGE,

Item 56, "1241511   9/1989   Japan
1288810  11/1989  Japan
1288813  11/1989  Japan
1274736  11/1989  Japan
4138436   5/1992  Japan" should read
--1-241511  9/1989  Japan
1-274736 11/1989  Japan
1-288810 11/1989  Japan
1-288813 11/1989  Japan
4-138436  5/1992  Japan--.

COLUMN 1,

Line 57, "the" should read --to--.

COLUMN 3,

Line 22, "of set of the" should read --of the set of--;
Line 32, "is" should read --is a--.

COLUMN 5,

Line 2, "light the ray" should read --the light ray--;
line 9, "lens," should read --lens--;
Line 40, "sensor" should read --the sensors--;
Line 57, "the" should be deleted;
Line 58, "of" should read --of the--.

UNITED STATES PATENT AND TRADEMARK OFFICE
CERTIFICATE OF CORRECTION

PATENT NO. : 5,455,654
DATED : October 3, 1995
INVENTOR(S) : KENJI SUZUKI

It is certified that error appears in the above-indentified patent and that said Letters Patent is hereby corrected as shown below:

COLUMN 6,

Line 23, "mode," should read --mode--;
Line 29, "less" should read --loses--;
Line 32, "obtain" should read --obtained--;
Line 61, "An" should read --A--.

COLUMN 7,

Line 17, "comprises" should read --comprise--;
Line 58, "of" should read --of a--.

COLUMN 8,

Line 19, "an" should be deleted;
Line 43, "comprises" should read --comprise--.

COLUMN 9,

Line 1, "points" should read --point--;
Line 10, "comprises" should read --comprise--;
Line 30, "view" should read --view field--;

UNITED STATES PATENT AND TRADEMARK OFFICE
CERTIFICATE OF CORRECTION

PATENT NO.    : 5,455,654
DATED         : October 3, 1995
INVENTOR(S)   : Kenji Suzuki It is certified that error appears in the above-indentified patent and that said Letters Patent is hereby corrected as shown below:

Column 9, line 51, "comprises" should read —comprise—.

Signed and Sealed this

Nineteenth Day of March, 1996

Attest:

BRUCE LEHMAN

Attesting Officer          Commissioner of Patents and Trademarks